(12) United States Patent
Di Iorio et al.

(10) Patent No.: US 12,170,389 B2
(45) Date of Patent: Dec. 17, 2024

(54) INTERCONNECTOR FOR A STACK OF SOLID OXIDE CELLS OF THE SOEC/SOFC TYPE INCLUDING DIFFERENT ELEMENTS IN RELIEF

(71) Applicant: COMMISSARIAT À L'ENERGIE ATOMIQUE ET AUX ÉNERGIES ALTERNATIVES, Paris (FR)

(72) Inventors: Stéphane Di Iorio, Grenoble (FR); Bruno Oresic, Grenoble (FR); Karl Vulliez, Grenoble (FR)

(73) Assignee: COMMISSARIAT A L'ENERGIE ATOMIQUE ET AUX ENERGIES, Paris (FR)

( * ) Notice: Subject to any disclaimer, the term of this patent is extended or adjusted under 35 U.S.C. 154(b) by 0 days.

(21) Appl. No.: 18/696,584

(22) PCT Filed: Sep. 27, 2022

(86) PCT No.: PCT/FR2022/051814
§ 371 (c)(1),
(2) Date: Mar. 28, 2024

(87) PCT Pub. No.: WO2023/052721
PCT Pub. Date: Apr. 6, 2023

(65) Prior Publication Data
US 2024/0339635 A1 Oct. 10, 2024

(30) Foreign Application Priority Data
Sep. 29, 2021 (FR) ...................... 2110283

(51) Int. Cl.
H01M 8/0247 (2016.01)
H01M 8/0208 (2016.01)
(Continued)

(52) U.S. Cl.
CPC ....... *H01M 8/0247* (2013.01); *H01M 8/0208* (2013.01); *H01M 8/0263* (2013.01); *H01M 8/2432* (2016.02); *H01M 2008/1293* (2013.01)

(58) Field of Classification Search
CPC ............ H01M 8/0247; H01M 8/0208; H01M 8/0263; H01M 8/2432; H01M 2008/1293
See application file for complete search history.

(56) References Cited

U.S. PATENT DOCUMENTS

2014/0147692 A1    5/2014   Brandner

FOREIGN PATENT DOCUMENTS

EP    2937926 B1    7/2016
EP    3370290 A1    9/2018
(Continued)

OTHER PUBLICATIONS

Search Report for International Application No. PCT/FR2022/051814, dated Jan. 16, 2023.
(Continued)

Primary Examiner — Helen Oi K Conley
(74) Attorney, Agent, or Firm — Pearne & Gordon LLP

(57) ABSTRACT

An interconnector for a stack of solid oxide cells of the SOEC/SOFC type, intended to be arranged between two adjacent electrochemical cells, which includes a flat face whereon at least one first group of identical first elements in relief and a second group of identical second elements in relief are formed, the first elements in relief having different geometric features with respect to the second elements in relief, the height of each first element in relief being different from the height of each second element in relief, the contact width of each first element in relief being different from the contact width of each second element in relief.

16 Claims, 8 Drawing Sheets

(51) Int. Cl.
*H01M 8/0263* (2016.01)
*H01M 8/12* (2016.01)
*H01M 8/2432* (2016.01)

(56) References Cited

FOREIGN PATENT DOCUMENTS

| EP | 3798335 A1 | 3/2021 |
| FR | 2996065 A1 | 3/2014 |
| FR | 3024985 A1 | 2/2016 |
| FR | 3045215 A1 | 6/2017 |
| FR | 3066201 A1 | 11/2018 |
| KR | 20160043830 A | 4/2016 |

OTHER PUBLICATIONS

Written Opinion for International Application No. PCT/FR2022/051814, dated Jan. 16, 2023.
Preliminary Search Report and Written Opinion for French Application No. 2110283, dated May 18, 2022.

INTERCONNECTOR FOR A STACK OF SOLID OXIDE CELLS OF THE SOEC/SOFC TYPE INCLUDING DIFFERENT ELEMENTS IN RELIEF

CROSS-REFERENCE TO RELATED APPLICATIONS

This is a National Stage application of PCT international application PCT/FR2022/051814, filed on Sep. 27, 2022, which claims the priority of French Patent Application No. 2110283, filed Sep. 29, 2021, both of which are incorporated herein by reference in their entirety.

TECHNICAL FIELD

The present invention relates to the general field of High Temperature Electrolysis (HTE), in particular High Temperature Steam Electrolysis (HTSE), the electrolysis of carbon dioxide ($CO_2$), or even the high temperature co-electrolysis of steam and of carbon dioxide ($CO_2$).

More precisely, the invention relates to the field of high temperature Solid Oxide Electrolyser Cells (SOEC).

It also relates to the field of high temperature Solid Oxide Fuel Cells (SOFC).

Thus, more generally, the invention refers to the field of stacks of solid oxide cells of the SOEC/SOFC type operating at high temperature.

More precisely, the invention relates to an interconnector for a stack of solid oxide cells of the SOEC/SOFC type including groups of elements in relief of different geometries, as well as a stack of solid oxide cells of the SOEC/SOFC type comprising a plurality of such interconnectors.

PRIOR ART

In the context of a high temperature solid oxide electrolyser of the SOEC type, this concerns converting by means of an electric current, within the same electrochemical device, steam ($H_2O$) into dihydrogen ($H_2$) or other fuels such as methane ($CH_4$), natural gas, biogas, and into dioxygen ($O_2$), and/or also converting carbon dioxide ($CO_2$) into carbon monoxide (CO) and into dioxygen ($O_2$). In the context of a high temperature solid oxide fuel cell of the SOFC type, the inverse operation is used to produce an electric current and heat by being supplied with dihydrogen ($H_2$) and with dioxygen ($O_2$), typically with air and with natural gas, namely by methane ($CH_4$). In the interest of simplicity, the following description favours the operation of a high temperature solid oxide electrolyser of the SOEC type performing the electrolysis of steam. However, this operation is applicable to the electrolysis of carbon dioxide ($CO_2$), or even to the high temperature co-electrolysis (HTE) of steam with carbon dioxide ($CO_2$). In addition, this operation can be transposed to the case of a high temperature solid oxide fuel cell of the SOFC type.

To perform the electrolysis of water, it is advantageous to perform it at high temperature, typically between 600 and 1,000° C., because it is more advantageous to electrolyse steam than liquid water and because some of the energy required for the reaction can be provided by heat, which is less expensive than electricity.

To implement high temperature steam electrolysis (HTSE), a high temperature solid oxide electrolyser of the SOEC type consists of a stack of elementary units each including a solid oxide electrolysis cell, or also electrochemical cell, consisting of three anode/electrolyte/cathode layers superposed on one another, and of interconnection plates often made of metal alloys, also called bipolar plates or interconnectors. Each electrochemical cell is held tightly between two interconnection plates. A high temperature solid oxide electrolyser of the SOEC type is then an alternating stack of electrochemical cells and interconnectors. A high temperature solid oxide fuel cell of the SOFC type consists of the same type of stack of elementary units. As this technology is reversible, the same stack can operate in electrolysis mode and produce hydrogen and oxygen from water and electricity, or in fuel cell mode and produce electricity from hydrogen and oxygen.

Each electrochemical cell corresponds to an electrolyte/electrode assembly, which is typically a ceramic multilayer assembly the electrolyte of which is formed by a central ion-conductive layer, this layer being solid, dense and leaktight, and held tightly between the two porous layers forming the electrodes. It should be noted that additional layers may exist, but which are only used to improve one or more of the layers already described.

Electrical and fluidic interconnection devices are electronic conductors that ensure, from an electrical point of view, the connection of each electrochemical cell of the elementary units in the stack of elementary units, guaranteeing the electrical contact between one face and the cathode of a cell and between the other face and the anode of the next cell, and from a fluidic point of view, the addition of reagents and the evacuation of products for each of the cells. Thus, the interconnectors ensure the functions of conveying and collecting electric current and delimit gas circulation compartments, for the distribution and/or collection.

More precisely, the main function of the interconnectors is to ensure the passage of the electric current but also the circulation of the gases within the vicinity of each cell (namely: injected steam, extracted hydrogen and oxygen for the HTE electrolysis; air and fuel of which the injected hydrogen and extracted steam for an SOFC cell), and to separate the anode and cathode compartments of two adjacent cells, which are the gas circulation compartments respectively on the side of the anodes and of the cathodes of the cells.

In particular, for a high temperature solid oxide electrolyser of the SOEC type, the cathode compartment includes steam and hydrogen, produced from the electrochemical reaction, whereas the anode compartment includes a draining gas, if present, and oxygen, another product of the electrochemical reaction. For a high temperature solid oxide fuel cell of the SOFC type, the anode compartment includes the fuel, whereas the cathode compartment includes the oxidant.

To perform the high temperature electrolysis (HTE) of steam, steam ($H_2O$) is injected into the cathode compartment. Under the effect of the electric current applied to the cell, the dissociation of water molecules in vapour form is performed at the interface between the hydrogen electrode (cathode) and the electrolyte: this dissociation produces dihydrogen ($H_2$) gas and oxygen ions ($O^{2-}$). The dihydrogen ($H_2$) is collected and evacuated at the outlet of the hydrogen compartment. The oxygen ions ($O^{2-}$) migrate through the electrolyte and recombine into dioxygen ($O_2$) at the interface between the electrolyte and the oxygen electrode (anode). A draining gas, such as air, may circulate at the anode and thus collect the oxygen generated in gas form at the anode.

To ensure the operation of a solid oxide fuel cell (SOFC), air (oxygen) is injected into the cathode compartment of the cell and hydrogen into the anode compartment. The oxygen of the air will dissociate into $O^{2-}$ ions. These ions will migrate in the electrolyte from the cathode to the anode to oxidise hydrogen and form water with a simultaneous production of electricity. In an SOFC cell, as in SOEC electrolysis, steam is located in the dihydrogen ($H_2$) compartment. Only the polarity is inverted.

By way of illustration, FIG. 1 shows a schematic view showing the operating principle of a high temperature solid oxide electrolyser of the SOEC type. The function of such an electrolyser is to convert steam into hydrogen and into oxygen according to the following electrochemical reaction:

$$2H_2O \rightarrow 2H_2 + O_2.$$

This reaction is performed electrochemically in the cells of the electrolyser. As shown schematically in FIG. 1, each elementary electrolysis cell 1 is formed of a cathode 2 and of an anode 4, placed on either side of a solid electrolyte 3. The two electrodes (cathode and anode) 2 and 4 are ionic and/or electronic conductors, made of porous material, and the electrolyte 3 is gas tight, an electronic insulator and an ionic conductor. In particular, the electrolyte 3 may be an anionic conductor, more precisely an anionic conductor of $O^{2-}$ ions and the electrolyser is then known as an anionic electrolyser, as opposed to proton electrolytes ($H^+$).

The electrochemical reactions take place at the interface between each of the electronic conductors and the ionic conductor.

At the cathode 2, the half-reaction is as follows:

$$2H_2O + 4e^- \rightarrow 2H_2 + 2O^{2-}.$$

At the anode 4, the half-reaction is as follows:

$$2O^{2-} \rightarrow O_2 + 4e^-.$$

The electrolyte 3, intercalated between the two electrodes 2 and 4, is the migration site of the $O^{2-}$ ions under the effect of the electrical field created by the potential difference imposed between the anode 4 and the cathode 2.

As illustrated between brackets in FIG. 1, steam at the inlet of the cathode may be accompanied by hydrogen $H_2$ and the hydrogen produced and recovered at the outlet may be accompanied by steam. Likewise, as illustrated in dotted lines, a draining gas, such as air, may further be injected into the inlet on the anode side to evacuate the oxygen produced. The injection of a draining gas has an additional function of acting as a temperature controller.

An elementary electrolyser, or electrolysis reactor, consists of an elementary cell such as described above, with a cathode 2, an electrolyte 3, and an anode 4, and two interconnectors that ensure the electrical and fluidic distribution functions.

To increase the hydrogen and oxygen flows produced, it is known to stack a plurality of elementary electrolysis cell on one another by separating them by interconnectors. The assembly is positioned between two end interconnexion plates that support the electrical supplies and the gas supplies of the electrolyser (electrolysis reactor).

A high temperature solid oxide electrolyser of the SOEC type thus comprises at least one, generally a plurality of electrolysis cells stacked on one another, each elementary cell being formed of an electrolyte, a cathode and an anode, the electrolyte being intercalated between the anode and the cathode.

As indicated above, the electrical and fluidic interconnection devices that are in electrical contact with one or more electrodes in general ensure the functions for conveying and collecting electric current and delimit one or more of the gas circulation compartments.

Thus, the function of the so-called cathode compartment is to distribute the electric current and steam as well as to recover hydrogen at the cathode in contact.

The function of the so-called anode compartment is to distribute the electric current as well as to recover the oxygen produced at the anode in contact, possibly using a draining gas.

FIG. 2 shows an exploded view of elementary units of a high temperature solid oxide electrolyser of the SOEC type according to the prior art. This electrolyser includes a plurality of elementary electrolysis cells C1, C2, of the solid oxide cell (SOEC) type, stacked alternately with the interconnectors 5. Each cell C1, C2 consists of a cathode 2.1, 2.2 and of an anode (only the anode 4.2 of the cell C2 is shown), between which an electrolyte is disposed (only the electrolyte 3.2 of the cell C2 is shown).

The interconnector 5 is typically a metal alloy component that ensures the separation between the cathode 50 and anode compartments 51, defined by the volumes between the interconnector 5 and the adjacent cathode 2.1 and between the interconnector 5 and the adjacent anode 4.2 respectively. It also ensures the distribution of the gases to the cells. The injection of steam into each elementary unit is carried out in the cathode compartment 50. The collection of the hydrogen produced and of the residual steam at the cathode 2.1, 2.2 is carried out in the cathode compartment 50 downstream of the cell C1, C2 after dissociation of the steam by the latter. The collection of the oxygen produced at the anode 4.2 is carried out in the anode compartment 51 downstream of the cell C1, C2 after dissociation of the steam by the latter. The interconnector 5 ensures the passage of the current between the cells C1 and C2 by direct contact with the adjacent electrodes, that is to say between the anode 4.2 and the cathode 2.1.

As the operating conditions of a high temperature solid oxide electrolyser (SOEC) are very similar to those of a solid fuel cell (SOFC), the same technological constraints are found.

Thus, the correct operation of such stacks of solid oxide cells of the SOEC/SOFC type operating at high temperature mainly requires meeting the points mentioned below.

Firstly, an electrical insulation between two successive interconnectors is necessary, otherwise the electrochemical cell will be short circuited, and also a good electrical contact and a sufficiently large contact surface are necessary between a cell and an interconnector. The lowest possible ohmic resistance is sought between cells and interconnectors.

Moreover, it is necessary to have leaktightness between the anode and cathode compartments, otherwise the gases produced will recombine resulting in a loss of efficiency and above all the appearance of hot spots that damage the stack.

Finally, it is essential to have good distribution of the gases both at the inlet and at the product recovery points, otherwise there will be a loss of efficiency, inhomogeneity of pressure and of temperature within the various elementary units, or even unacceptable degradations of the electrochemical cells.

To succeed in increasing the production efficiency and obtain a good operating homogeneity of the stacks of solid oxide cells of the SOEC/SOFC type operating at high temperature, the role of the interconnectors is essential, in particular to obtain good electrical contacts between the various parts of the stacks and also to enable good distribution of the gases within the electrochemical cells. The interconnectors may be metal and consist of three thin plates, as described in the French patent application FR 3 024 985 A1.

These interconnectors may further be described in the French patent application FR 2 996 065 A1. In this application, the interconnector corresponds to a metal alloy substrate component, the base element of which is iron (Fe) or nickel (Ni), with one of the main flat faces coated with a thick ceramic or metal layer, grooved by delimiting channels suitable for the distribution and/or the collection of gases, such as steam $H_2O$, $H_2$; $O_2$, draining gas. In particular, a thick ceramic contact layer based on strontium-doped lanthanum manganite may be provided on the oxygen electrode side (HTE anode, cathode for a SOFC cell). "Thick layer" means a layer the thickness of which is greater than that of a layer obtained by a so-called "thin layer" technology typically a thickness between 2 and 15 µm. Thus, good performances are obtained with a good homogeneity in the stacks of solid oxide cells of the SOFC/SOEC type with low production costs.

Nevertheless, there is still a need to optimise such interconnectors, in particular from a fluidic and mechanical point of view.

DISCLOSURE OF THE INVENTION

The aim of the invention is to remedy at least partially the needs mentioned above and the drawbacks relating to the embodiments of the prior art.

It particularly aims to produce an optimised interconnector design for stacks of solid oxide cells of the SOEC/SOFC type, in particular by means of a specific machining of a contact layer of the interconnector making it possible to obtained, for a given clamping, a high electrical conductivity of the interconnector and a good electrical or mechanical contact, while reducing the pressure losses for the passage of the gases.

Thus, the object of the invention, according to one of its aspects, is an interconnector for a stack of solid oxide cells of the SOEC/SOFC type operating at high temperature, intended to be arranged between two adjacent electrochemical cells of the stack, each electrochemical cell being formed of a cathode, of an anode and of an electrolyte intercalated between the cathode and the anode, characterised in that it includes a flat face whereon at least one first group of identical first elements in relief with respect to the flat face and a second group of identical second elements in relief with respect to the flat face are formed,
 the first elements in relief having different geometric features with respect to the second elements in relief,
 the height of each first element in relief, measured as being the largest vertical dimension of the first element in relief with respect to the flat face, being different from the height of each second element in relief, measured as being the largest vertical dimension of the second element in relief,
 the contact width of each first element in relief, measured as being the largest horizontal dimension with respect to the flat face of the outer contact end of each first element in relief, opposite the inner end in contact with the flat face and intended to be in contact with an electrochemical cell, being different from the contact width of each second element in relief, measured as being the largest horizontal dimension with respect to the flat face of the outer contact end of each second element in relief, opposite the inner end in contact with the flat face and intended to be in contact with an electrochemical cell.

The interconnector according to the invention may further include one or more of the following features taken alone or according to any possible technical combinations.

The contact width of each first element in relief may be between 0.5 and 5 mm, preferably equal to 1 mm.

The contact width of each second element in relief may be between 0.005 mm and 0.5 mm, preferably equal to 100 µm.

The height of each first element in relief may be between 200 µm and 1,000 am, preferably equal to 350 µm.

The height of each second element in relief may be between 250 µm and 1,050 µm, preferably equal to 400 µm.

The difference between the height of each second element in relief and the height of each first element in relief may be between 5 am and 500 µm, preferably in the order of 50 µm.

Moreover, the interconnector may include a number N, N being a whole number greater than or equal to 2, preferably between 2 and 50, also preferably equal to 5, of groups of elements in relief, formed on the flat face, the elements in relief of the same group all being identical, and the elements in relief of different groups having different geometric features, namely different heights and different contact widths.

The elements in relief may be in the form of teeth or grooves, disposed parallel with one another, the spaces between the elements in relief forming gas circulation channels.

The elements in relief may also be in the form of pads, particularly of cylindrical shape, the spaces between the elements in relief forming a single serpentine gas circulation channel. Other shapes are also possible, for example a parallelepiped shape.

Furthermore, the elements in relief are regularly distributed over the flat face, being particularly spaced the same distance from one another, particularly between 50 µm and 5 mm, preferably equal to 750 µm, according to at least one horizontal direction on the flat face.

At least one area of the flat face, particularly a central area, may be devoid of elements in relief.

In addition, the elements in relief having the largest width may be located around the periphery of the flat face, at a distance from the other elements in relief and from the gas circulation channel(s) formed by the spaces between the other elements in relief.

The interconnector may include a metal alloy substrate, particularly of the chromia-forming type the base element of which is iron or nickel, in particular ferritic steels of the Uginox® K41 type or of the VDM® Crofer type, having two main flat faces, one of the main flat faces comprising a first coating layer forming a first contact layer with an electrochemical cell, the other of the main flat faces comprising a second coating layer forming a second contact layer with an electrochemical cell, the first coating layer and/or the second coating layer comprising a flat face and elements in relief formed thereon, particularly by machining.

The first coating layer may be a thick ceramic coating layer, porous or not, the ceramic material being particularly selected from a lanthanum manganite of formula $La_{1-x}Sr_xMO_3$ with M (transition metals)=nickel (Ni), iron (Fe), cobalt (Co), manganese (Mn), chrome (Cr), alone or a mixture thereof, or materials of lamellar structure such as the lanthanide nickelates of formula $Ln_2NiO_4$ (Ln=lanthanum (La), neodymium (Nd), praseodymium (Pr)), or another electrically conductive perovskite oxide.

The second coating layer may be a thick metal coating layer, particularly of the grid type or of dense material, the metal material particularly being selected from nickel (Ni) and its alloys or chromia-forming alloys the base element of which is iron (Fe), in particular ferritic steels of the Uginox® K41 type or of the VDM® Crofer type.

Moreover, another object of the invention, according to another of its aspects, is a stack of solid oxide cells of the SOEC/SOFC type operating at high temperature, including a plurality of electrochemical cells each formed of a cathode, of an anode and of an electrolyte intercalated between the cathode and the anode, and a plurality of interconnectors such as defined above, each arranged between two adjacent electrochemical cells.

BRIEF DESCRIPTION OF THE DRAWINGS

The invention may be better understood upon reading the following detailed description, non-limiting examples of implementation thereof, as well as upon examination of the figures, schematic and partial, of the drawing appended, wherein.

In all of these figures, identical references may designate identical or similar elements.

In addition, the various portions shown in the figures are not necessarily according to a uniform scale, to make the figures more readable.

DETAILED DESCRIPTION OF PARTICULAR EMBODIMENTS

Figure 1:
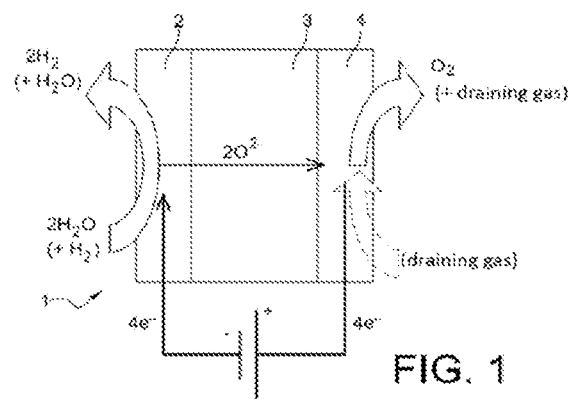
FIG. 1 is a schematic view showing the operating principle of a high temperature solid oxide electrolyser (SOEC)
Figure 2:
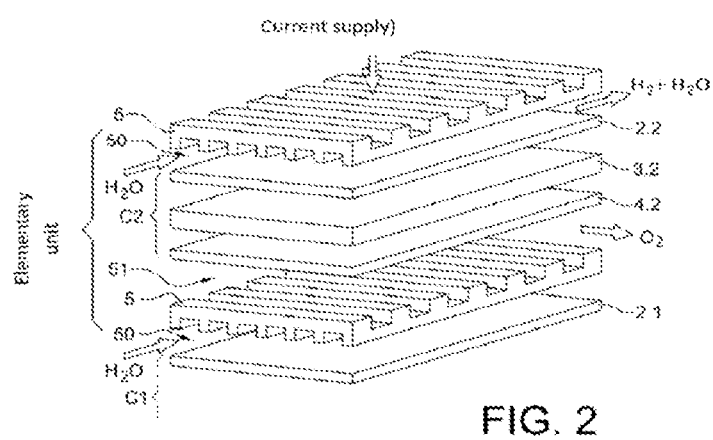
FIG. 2 is an exploded schematic view of a portion of a high temperature solid oxide electrolyser (SOEC) comprising interconnectors according to the prior art.

FIGS. 1 and 2 have already been described above in the part relating to the prior art. It is specified that, for FIGS. 1 and 2, the symbols and the $H_2O$ steam supply arrows, for distributing and recovering dihydrogen $H_2$, oxygen $O_2$, air and electric current, are shown for the purposes of clarity and accuracy, to illustrate the operation of the devices shown.

Furthermore, it should be noted that all of the constituents (anode/electrolyte/cathode) of a given electrochemical cell are preferably ceramics. The operating temperature of a stack of the high temperature SOEC/SOFC type is moreover typically between 600 and 1,000° C.

In addition, the possible terms "upper" and "lower" are to be understood here according to the normal direction of orientation of a stack of the SOEC/SOFC type when in its use configuration.

An interconnector 5 may have a particular geometry, particularly grooved with the presence of teeth and channels. For example, as described in the French patent application FR 2 996 065 A1, the interconnector 5 may consist of a component including a metal alloy substrate, particularly of the chromia-forming type, the base element of which is iron or nickel, in particular, ferritic steels of the Uginox® K41 type or of the VDM® Crofer type, this substrate having two main flat faces, one of the faces being coated with a coating including a thick ceramic layer, grooved by delimiting channels for the distribution and/or the collection of gases and teeth, this layer also being referred to as "contact layer". Thus, the teeth and channels may be formed on the contact layer. In addition, in the following description, it is understood that the teeth and channels, or more generally the reliefs, of an interconnector 5 may be formed of a contact layer of this interconnector 5.

Figure 3:
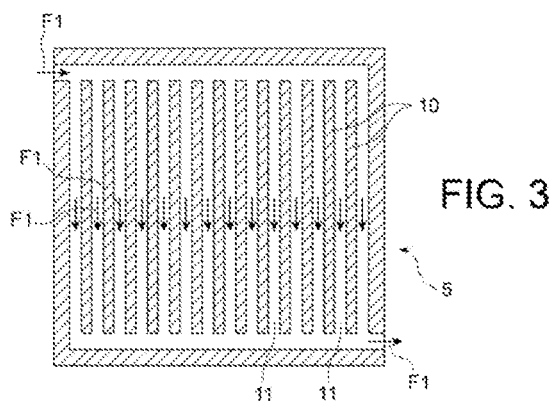
FIG. 3 is a schematic front view of an interconnector according to the prior art of a stack of a high temperature solid oxide electrolysis cell (SOEC) or of a fuel cell (SOFC) operating at high temperature.
Figure 3A:
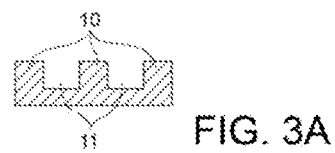
FIG. 3A is a detailed sectional view of an interconnector according to [FIG. 3]
Figure 3B:
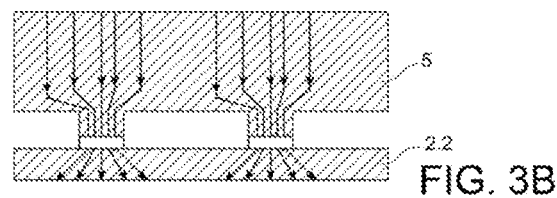
FIG. 3B is a view similar to that of [FIG. 3] showing the current lines passing through the interconnector.

FIGS. 3, 3A and 3B show an interconnector 5 commonly used in a stack of the high temperature SOEC/SOFC type. The conveyance or the collection of the current at the electrode is performed by the teeth 10, or ribs, which are in direct mechanical contact with the electrode concerned. The conveyance of steam at the cathode or of draining gas at the anode in an HTE electrolyser, the conveyance of dioxygen at the cathode or of hydrogen at the anode in an SOFC cell is symbolised by the arrows F1 that can be seen in FIG. 3.

The collection of the hydrogen produced at the cathode or of the oxygen produced at the anode in an HTE electrolyser, the collection of the water produced at the cathode or of the excess hydrogen at the anode in an SOFC cell is carried out by the channels 11 that open into a fluidic connection, commonly known as manifold, which is common to the stack of cells. The structure of these interconnectors 5 is made to achieve a compromise between the two functions of conveyance and of collection (gas/current).

To obtain a good electrical conductivity between an interconnector 5, particularly the contact layer, and an electrochemical cell, the teeth 10 should be spaced fairly close together. However, this then tends to have a small passage surface for the gases, which may lead to significant pressure losses during the operation.

Moreover, the interconnector 5 should make it possible to correctly circulate the gases and to have low pressure losses, which may be achieved using wide channels 11. Nevertheless, this leads to having teeth 10 spaced apart from one another, which is detrimental to the electrical conductivity.

Figure 4:
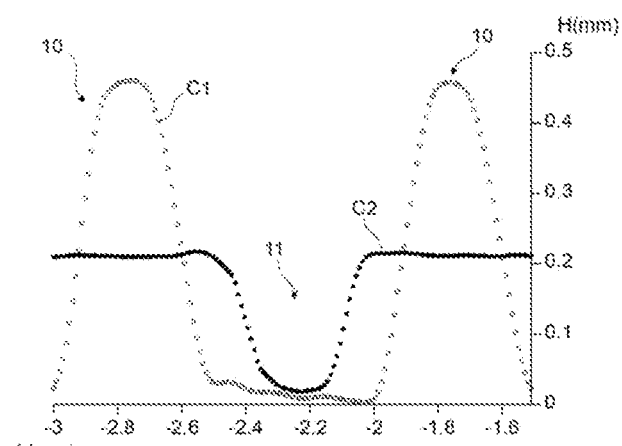
FIG. 4 illustrates, in graph form, the height, expressed in mm, of the teeth of an interconnector depending on the length, expressed in mm, for a configuration before clamping and a configuration after clamping of a stack of a high temperature electrolysis cell (SOEC) or of a high temperature fuel cell (SOFC)

Furthermore, the geometry of the teeth 10 and of the channels 11 should make it possible to accommodate the surface defects, particularly of the cells and of the interconnector 5. For this, they must be able to crush easily. This may, for example, be obtained by producing narrow teeth 10. However, if the teeth 10 crush significantly, the height of the channels 11 will reduce significantly and the passage surface for the gases will thereby be reduced, which will lead to greater pressure losses. By way of example, FIG. 4 illustrates, in graph form, the height H, expressed in mm, of the teeth 10 depending on the length L, expressed in mm, for a configuration before clamping C1 and a configuration after clamping C2.

The force applied to a stack of solid oxide cells of the SOEC/SOFC type, or stack, makes it possible to calculate the local clamping stress. Thus, if a force F of 1,000 N is applied and the bearing surface S is 100 $cm^2$, then the F/S stress will be 0.2 MPa. If the contact is carried out using the teeth 10 of an interconnector 5, particularly of its contact layer, which represent half of the surface, then the local stress will be 0.4 MPa.

Three real experiments (E1, E2, E3) for producing hydrogen from a stack of the SOEC type with five cells of surface area of 100 $cm^2$ were performed with two geometries (tooth A and tooth B) of interconnectors and two different clamping forces (force A and force B). A total flow of 12 Nml/min/$cm^2$ of mixture of steam and of hydrogen were sent. The $H_2O/H_2$ mixture is 90% of $H_2O$ and 10% of $H_2$. The temperature of the stack is 800° C.

A polarisation curve (E1 for Tooth A, Force A; E2 for Tooth B, Force A; E3 for Tooth B, Force B) is carried out each time by progressively increasing the current i, expressed in $A/cm^2$, and by measuring the voltage E, expressed in V, of associated cells. These curves make it possible to measure the maximum use rate t of steam as well as the Area Specific Resistance (ASR) coming from the cells, interconnectors, interfaces, connection systems, etc.

The reference interconnector geometry includes an interconnector, particularly a contact layer, with teeth 10 of width A (tooth A). A second interconnector geometry was produced with teeth 10 of width B (tooth B), three times narrower than the width A. The force applied may be the reference force A (force A) or the force B, three times less than the force A.

Figure 5:
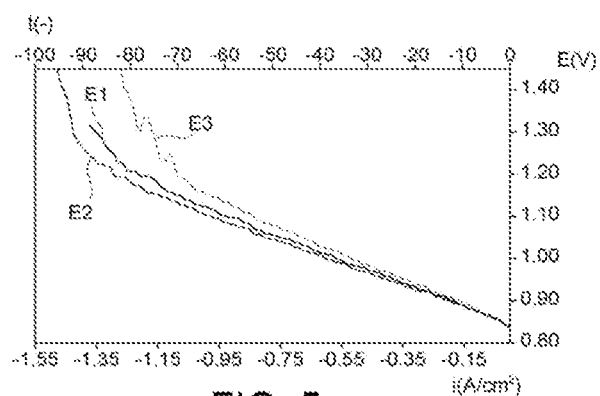
FIG. 5 shows, graphically, the polarisation curves for three different configurations with two different teeth geometries and two different clamping forces.

FIG. 5 illustrates, in graph form, the polarisation curves obtained E1, E2, E3 for three stacks with two interconnector geometries (Tooth A, Tooth B) and two different forces (Force A, Force B). In addition, Table 1 below shows the relative pressure losses obtained for the $O_2$ chamber.

TABLE 1

| | pressure losses | |
|---|---|---|
| | Tooth A | Tooth B |
| Force A | 100 | 180 |
| Force B | | 60 |

Thus, when the teeth are thinner (tooth B) by maintaining the same clamping force (force A), the ASR are lower, therefore the performances are improved, but the pressure losses are increased. The crushing of the teeth has reduced the passage surface for the gases. When the teeth are thinner (tooth B) but the force is reduced (force B), the performances are degraded (higher ASR and reduced maximum use rate) but the pressure losses are significantly reduced.

The principle of the invention, which will now be described with reference to FIGS. 7 to 14, thus aims to optimise these aspects, and particularly obtain a design of interconnector, in particular of contact layer, making it possible to both have good crushing of the teeth 10 and maintain gas circulation channels 11 with a significant volume.

Figure 6:
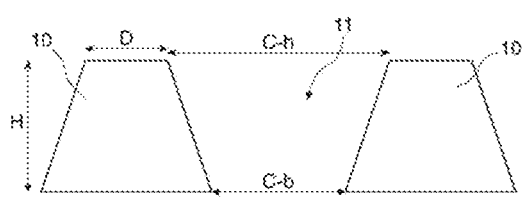
FIG. 6 is a sectional view of two teeth and of a channel of a conventional interconnector of a stack of high temperature solid oxide cells of the SOEC/SOFC type.

An interconnector 5 for a stack of solid oxide cells of the SOEC/SOFC type operating at high temperature, intended to be arranged between two adjacent electrochemical cells 1 of the stack, each cell being formed of a cathode, of an anode and of an electrolyte intercalated between the cathode and the anode, usually has a regular geometry. In particular, the contact layer forming a coating on one of the faces of a metal alloy substrate of the interconnector 5 conventionally includes teeth 10 and channels 11 of regular geometry. Thus, the teeth 10 all have the same dimensions (height and width) and all of the channels 11 have the same width. The main features of the teeth 10 and of the channels 11 are detailed in the sectional view in FIG. 6. Thus, the contact width of a tooth 10 is noted D, the width of the top of the channel 11 is noted C-h whereas the width of the bottom of the channel 11 is noted C-b, and the height of the teeth 10 is noted H.

In accordance with the invention, the geometry of the interconnector 5, particularly of the contact layer, is modified to obtain an inhomogeneity enabling both an optimal electrical contact and a gas distribution offering only little resistance during the passage of the gases, and therefore little overpressure. In particular, an inhomogeneous machining is performed to obtain teeth and channels with different features on the same interconnector 5, particularly on the same contact layer of this interconnector 5.

Thus, an interconnector 5 according to the invention includes a flat face P whereon at least a first group of identical first elements in relief 10a and a second group of identical second elements in relief 10b are formed, the first 10a and second 10b elements in relief having different geometric features.

Figure 7:
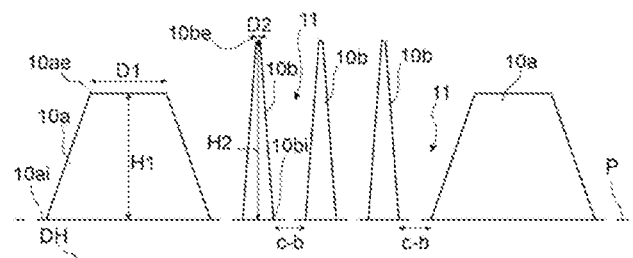
FIG. 7 is a sectional view of five teeth and of four channels of an interconnector in accordance with the invention for a stack of high temperature solid oxide cells of the SOEC/SOFC type, before clamping.
Figure 8:
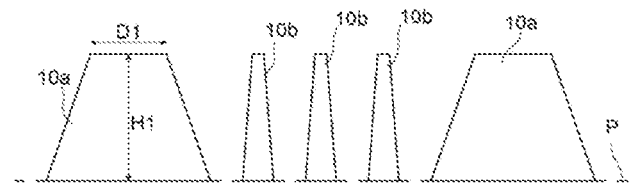
FIG. 8 is a sectional view of the configuration of [FIG. 7], after clamping.

FIGS. 7 and 8 show, before and after crushing, an example of embodiment with two types of machining geometry. However, a large number of different geometries may be provided for the interconnector 5 within the scope of the invention.

Thus, the height H1 of each first element in relief 10a, measured as being the largest vertical dimension of the first element in relief 10a with respect to the flat face P, is different from the height H2 of each second element in relief 10b, measured as being the largest vertical dimension of the second element in relief 10b. Likewise, the contact width D1 of each first element in relief 10a, measured as being the largest horizontal dimension with respect to the flat face P of the outer contact end 10ae of each first element in relief 10a, opposite the inner end 10ai in contact with the flat face P and intended to be in contact with an electrochemical cell 1, is different from the contact width D2 of each second element in relief 10b, measured as being the largest horizontal dimension with respect to the flat face P of the outer contact end 10be of each second element in relief 10b, opposite the inner end 10bi in contact with the flat face P and intended to be in contact with an electrochemical cell 1.

In particular, the contact width D1 of each first element in relief 10a is between 0.5 and 5 mm, preferably being equal to 1 mm. This wide width makes it possible to support the clamping constraints and to act as a crush limiter.

The contact width D2 of each second element in relief 10b is between 0.005 mm and 0.5 mm, preferably being equal to 100 µm. This narrow width makes it possible to have regular contact points around the entire contact surface of the electrochemical cell 1 without hindering fluid flows.

Moreover, the height H1 of each first element in relief 10a is lower than the height H2 of each second element in relief 10b, being respectively 350 and 400 µm. Thus, the elements in relief 10b of narrow width D2 ensure the electrical contact.

Figure 10:
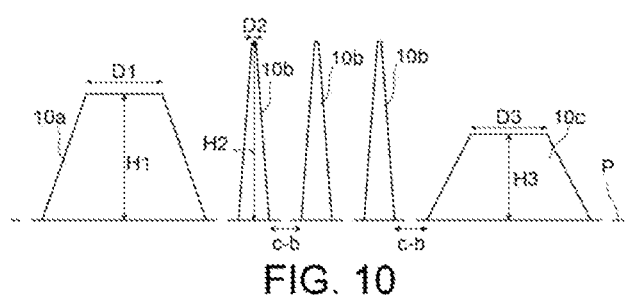
FIG. 10 is an alternative embodiment of the configuration of [FIG. 7]
Figure 11:
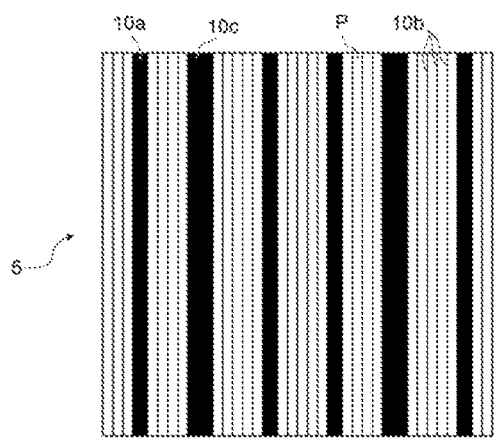
FIG. 11 is a top view of the configuration of [FIG. 10]
Figure 12:
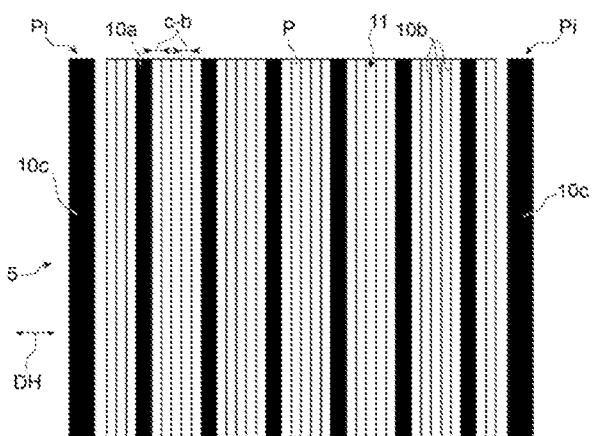
FIG. 12 is an alternative embodiment of the configuration of [FIG. 11]

It should be noted that in this example of FIGS. 7 and 8, as for FIGS. 10 to 12, the elements in relief 10a, 10b, 10c are in the form of teeth or grooves, disposed parallel with one another. However, the elements in relief may take any shape that guarantees ensuring the electrical contact and the circulation of gases. Thus, the spaces between the elements in relief 10a, 10b, 10c form gas circulation channels 11.

Moreover, the elements in relief 10a, 10b are here distributed regularly over the flat face P. Precisely, they are spaced the same distance C-b apart from one another, particularly between 50 µm and 5 mm, and preferably equal to 750 µm, according to at least one horizontal direction DH over the flat face P. The spacings between elements in relief 10a, 10b are therefore constant and make possible good distribution of the current within the electrode of the electrochemical cell 1. The value of the spacing may be dependent on the electrochemical cell 1 used.

During the clamping, the elements in relief 10b will crush first because they are higher. The crushing will be significant because the contact width D2 is narrow. This will then enable good accommodation of the geometric defects.

This crushing will continue until the height H2 of the elements in relief 10b reaches the height H1 of the elements in relief 10a. The contact surface will therefore increase rapidly, which will stop the crushing. This stopping of the crushing makes it possible to preserve significant spaces for the gas circulation channels 11. Thus, the pressure losses can remain low. In addition, as the spacing C-b between the elements in relief 10a, 10b is fairly small, a good electrical conductivity is obtained.

Advantageously, the invention does not require precisely adjusting the clamping force to stop the crushing. Indeed, the significant increase in surface when the contact with the elements in relief 10a is established makes it possible to significantly reduce the stress, limiting the effect of the initial force.

Figure 9:
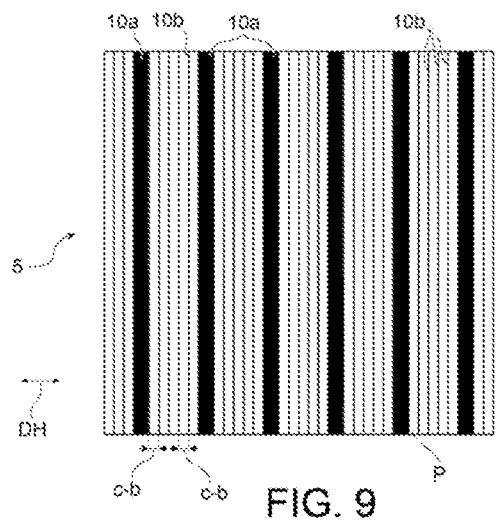
FIG. 9 is a top view of the configuration of [FIG. 7] and [FIG. 8]

FIG. 9 makes it possible to view the regular distribution of the first 10a and second 10b elements in relief of the example of FIGS. 7 and 8.

As the manufacturing of interconnectors 5 and of electrochemical cells 1 is not regular, it may further be advantageous to have an interconnector 5, particularly a contact layer of the interconnector 5 comprising the elements in relief, the crushing of which may be modulated during the operation.

Thus, by creating a number N of different geometries, easily accessible crushing stages can be obtained, even during a test. In other words, the interconnector may more generally include a number N, N being a whole number greater than or equal to 2, preferably between 2 and 50, also preferably equal to 5, of groups of elements in relief, formed on the flat face P, the elements in relief of the same group all being identical, and the elements in relief of different groups having different geometric features, namely different heights and different contact widths.

FIGS. 10 and 11 make it possible to illustrate the case for N=3, which is only an illustrative and non-limiting example of the invention. Thus, the interconnector 5 comprises first elements in relief 10a of contact width D1 and of height H1, second elements in relief 10b of contact width D2 and of height H2, and third elements in relief 10c of contact width D3 and of height H3. The values chosen are such that D3>D1>D2 and H2>H1>H3.

This possibility makes it possible to have a plurality of possible crushing levels. Thus, it is possible to have a crushing with a force 1 that will only crush the elements in relief 10b. If this is not sufficient, because the geometric defects to be compensated are significant, it is possible to change to a force 2, greater than the force 1, to crush the elements in relief 10a to the height H3 of the elements in relief 10c. The crushing and the contact can thus be regulated as required.

It is therefore possible to envisage, if necessary, having N different geometries of increasing contact width. The continuous increase of the clamping force would make it possible to crush by stages the elements in relief, then stop as soon as the contact is good and for an optimal crushing. Thus, an interconnector 5, or a contact layer thereof, which adapts to all geometries, is obtained.

FIG. 12 illustrates the possibility of having the elements in relief 10c having the largest contact width D3 that are located around the periphery Pi of the flat face P, at a distance from the other elements in relief 10a, 10b and from the gas circulation channels 11.

These elements in relief 10c form the crushing limiters since they have the greatest contact width D3. They may be located outside of active areas. In this manner, a maximum of surface is reserved for the passage of the gases.

Furthermore, any shape is possible for the elements in relief 10a, 10b, 10c. They are not necessarily in the shape of teeth as described above.

Figure 13:
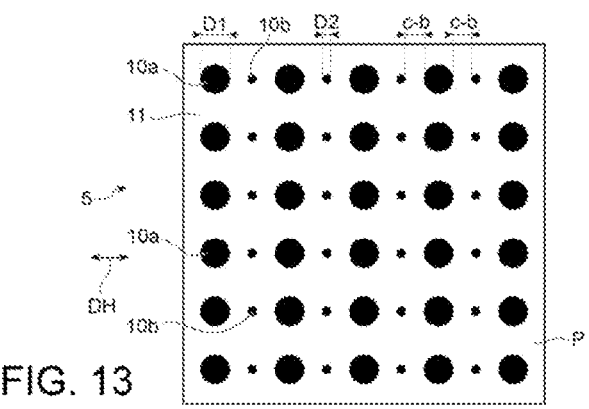
FIG. 13 is a geometric alternative embodiment of the configuration of [FIG. 9]
Figure 14:
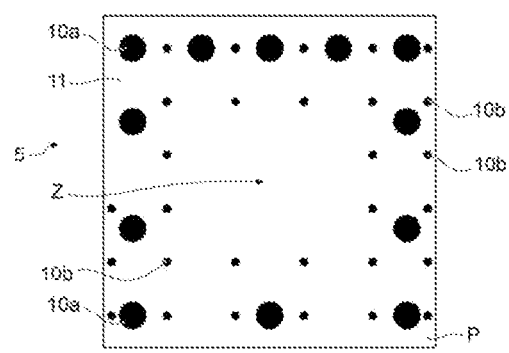
FIG. 14 is an alternative embodiment of the configuration of [FIG. 13]

Thus, FIGS. 13 and 14 illustrate the possibility of having elements in relief 10a, 10b in the form of pads, and particularly of cylindrical shape. Other shapes are also possible, for example a parallelepiped shape. The spaces between the elements in relief 10a, 10b then form a single serpentine gas circulation channel 11.

Advantageously, this may make it possible to more accurately regulate the stresses with a suitable surface and optimise the passage of the gases.

Moreover, FIG. 14 illustrates the possibility of having at least one area Z of the flat face P, here the central area Z, which is devoid of elements in relief. Indeed, the heating due to surfaces of electrochemical cells 1 that are too large may create overheating problems, and particularly at the centre of the cells 1 where the heat has difficulty in being evacuated. Thus, it is possible to intentionally limit the reactions at the core of the cells 1 by reducing the conductivity in the specific central area Z, which is thus intentionally devoid of electrical contacts.

It should be noted that, advantageously, the interconnector 5 according to the invention may include a metal alloy substrate, particularly of the chromia-forming type the base element of which is iron (Fe) or nickel (Ni), in particular ferritic steels of the Uginox® K41 type or of the VDM® Crofer type, having two main flat faces, as described in the French patent application FR 2 996 065 A1.

One of the main flat faces comprises a first coating layer forming a first contact layer with an electrochemical cell 1, and the other of the main flat faces comprises a second coating layer forming a second contact layer with an electrochemical cell 1.

The first coating layer and/or the second coating layer may comprise the flat face P and the elements in relief 10a, 10b, 10c formed thereon, particularly by machining, such as described above.

These elements in relief may or may not be identical on the first and second coating layers, and their distribution may or may not be identical on the first and second coating layers, when these two coating layers are provided with such elements in relief.

The first coating layer may particularly be a first thick ceramic contact layer, porous or not, particularly based on strontium-doped lanthanum manganite. It may be provided on the oxygen electrode side.

The second coating layer may particularly be a second thick metal, particularly based on nickel, contact layer. It may be provided on the hydrogen electrode side.

This second layer may in particular include at least two different types of nickel grids. On these grids, the number of meshes per cm$^2$ and the wire diameter may be modulated. It is for example possible to use a grid A of height Ha with a number of meshes Na, forming elements in relief, enabling it to crush significantly, and a second grid B of height Hb, less than the height Ha, with a number of meshes Nb, forming elements in relief, less than the number of meshes Na, so as to act as a crush limiter.

Figure 15:
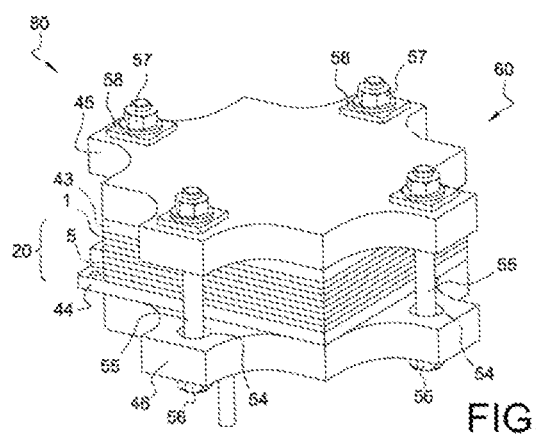
FIG. 15 shows, in perspective and by observation from the top, an assembly comprising a stack of solid oxide cells of the SOEC/SOFC type with interconnectors in accordance with the invention and a clamping system of the stack.

Moreover, FIG. 15 shows a stack 20 of solid oxide cells of the SOEC/SOFC type operating at high temperature in accordance with the invention.

More precisely, FIG. 15 shows an assembly 80 comprising the stack 20 of solid oxide cells of the SOEC/SOFC type and a clamping system 60.

This assembly 80 has a structure similar to that of the assembly described in the French patent application FR 3 045 215 A1.

The stack 20 includes a plurality of electrochemical cells 1 each formed of a cathode, of an anode and of an electrolyte intercalated between the cathode and the anode, and a plurality of interconnectors 5 in accordance with the invention each arranged between two adjacent electrochemical cells 1. This assembly of electrochemical cells 1 and of interconnectors 5 may also be designated as "stack".

In addition, the stack 20 includes an upper terminal plate 43 and a lower terminal plate 44, respectively also known as upper stack terminal plate 43 and lower stack terminal plate 44, between which the plurality of electrochemical cells 1 and the plurality of interconnectors 5 are clamped, or between which the stack is located.

Moreover, the assembly 80 also includes a clamping system 60 of the stack 20 of solid oxide cells of the SOEC/SOFC type, including an upper clamping plate 45 and a lower clamping plate 46, between which the stack 20 of solid oxide cells of the SOEC/SOFC type is clamped.

Each clamping plate 45, 46 of the clamping system 60 includes four clamping orifices 54. In addition, the clamping system 60 further includes four clamping rods 55, or tie rods, extending through a clamping orifice 54 of the upper clamping plate 45 and through a corresponding clamping orifice 54 of the lower clamping plate 46 to make it possible to assemble the upper 45 and lower clamping plates 46 to each other. In addition, the clamping system 60 includes clamping means 56, 57, 58 at each clamping orifice 54 of the upper 45 and lower clamping plates 46 cooperating with the clamping rods 55 to make it possible to assemble the upper 45 and lower clamping plates 46 to each other. More precisely, the clamping means include, at each clamping orifice 54 of the upper clamping plate 45, a first clamping nut 56 cooperating with the corresponding clamping rod 55 inserted through the clamping orifice 54. In addition, the clamping means include, at each clamping orifice 54 of the lower clamping plate 46, a second clamping nut 57 associated with a clamping washer 58, the latter cooperating with the corresponding clamping rod 55 inserted through the clamping orifice 54. The clamping washer 58 is located between the second clamping nut 57 and the lower clamping plate 46.

Of course, the invention is not limited to the examples of embodiments that have just been described. Miscellaneous modifications may be made by the person skilled in the art.

What is claimed is:

1. An interconnector for a stack of solid oxide cells of the SOEC/SOFC type operating at high temperature, intended to be arranged between two adjacent electrochemical cells of the stack, each electrochemical cell being formed of a cathode, of an anode and of an electrolyte intercalated between the cathode and the anode, the interconnector including:
a flat face whereon at least one first group of identical first elements in relief with respect to the flat face and a second group of identical second elements in relief with respect to the flat face are formed,
the first elements in relief having different geometric features with respect to the second elements in relief,
the height of each first element in relief, measured as being the largest vertical dimension of the first element in relief with respect to the flat face, being different from the height of each second element in relief, measured as being the largest vertical dimension of the second element in relief,
the contact width of each first element in relief, measured as being the largest horizontal dimension with respect to the flat face of the outer contact end of each first element in relief, opposite the inner end in contact with the flat face and intended to be in contact with an electrochemical cell, being different from the contact width of each second element in relief, measured as being the largest horizontal dimension of the with respect to the flat face of the outer contact end of each second element in relief, opposite the inner end in contact with the flat face and intended to be in contact with an electrochemical cell; and
a metal alloy substrate having two main flat faces, one of the main flat faces comprising a first coating layer forming a first contact layer with an electrochemical cell, the other of the main flat faces comprising a second coating layer forming a second contact layer with an electrochemical cell,
the first coating layer and/or the second coating layer comprising a flat face and elements in relief formed thereon.

2. The interconnector according to claim 1, wherein the contact width of each first element in relief is between 0.5 and 5 mm, preferably equal to 1 mm.

3. The interconnector according to claim 1, wherein the contact width of each second element in relief is between 0.005 mm and 0.5 mm, preferably equal to 100 μm.

4. The interconnector according to claim 1, wherein the height of each first element in relief is between 200 μm and 1,000 μm, preferably equal to 350 μm.

5. The interconnector according to claim 1, wherein the height of each second element in relief is between 250 μm and 1,050 μm, preferably equal to 400 μm.

6. The interconnector according to claim 1, wherein the difference between the height of each second element in relief and the height of each first element in relief is between 5 μm and 500 μm, particularly in the order of 50 μm.

7. The interconnector according to claim 1, further including a number N, N being a whole number greater than or equal to 2, preferably between 2 and 50, also preferably equal to 5, groups of elements in relief, formed on the flat face, the elements in relief of the same group all being identical, and the elements in relief of different groups having different geometric features, namely different heights and different contact widths.

8. The interconnector according to claim 1, wherein the elements in relief are in the form of teeth or grooves, disposed parallel with one another, the spaces between the elements in relief forming gas circulation channels.

9. The interconnector according to claim 1, wherein the elements in relief are in the form of pads, particularly of cylindrical shape, the spaces between the elements in relief forming a single serpentine gas circulation channel.

10. The interconnector according to claim 1, wherein the elements in relief are evenly distributed over the flat face, being particularly spaced the same distance from one another, particularly between 50 μm and 5 mm, preferably equal to 750 μm, according to at least one horizontal direction (DH) on the flat face.

11. The interconnector according to claim 1, wherein at least one area of the flat face, particularly a central area, is devoid of elements in relief.

12. The interconnector according claim 1, wherein the elements in relief having the largest width are located around the periphery of the flat face, at a distance from the other elements in relief and from the gas circulation channel(s) formed by the spaces between the other elements in relief.

13. The interconnector according to claim 1, wherein the metal alloy substrate is of the chromia-forming type the base element of which is iron (Fe) or nickel (Ni), and in that the elements in relief formed on said flat face are formed by machining.

14. The interconnector according claim 1, wherein the first coating layer is a thick ceramic coating layer, porous or not, the ceramic material being particularly selected from a lanthanum manganite of formula $La_{1-x}Sr_xMO_3$ with M (transition metals)=nickel (Ni), iron (Fe), cobalt (Co), manganese (Mn), chrome (Cr), alone or a mixture thereof, or materials of lamellar structure such as the lanthanide nickelates of formula $Ln_2NiO_4$ (Ln=lanthanum (La), neodymium (Nd), praseodymium (Pr)), or another electrically conductive perovskite oxide.

15. The interconnector according claim 1, wherein the second coating layer is a thick metal coating layer, the metal material being particularly selected from nickel (Ni) and its alloys or chromia-forming alloys the base element of which is iron (Fe).

16. A stack of solid oxide cells of the SOEC/SOFC type operating at high temperature, including a plurality of electrochemical cells each formed of a cathode, of an anode and of an electrolyte intercalated between the cathode and the anode, and a plurality of interconnectors according to claim 1, each arranged between two adjacent electrochemical cells.

* * * * *